United States Patent
Wurtenberger et al.

(10) Patent No.: US 10,340,594 B1
(45) Date of Patent: Jul. 2, 2019

(54) SYSTEMS AND METHODS FOR ADJUSTING VERTICAL BEAM WIDTH

(71) Applicant: Sprint Communications Company L.P., Overland Park, KS (US)

(72) Inventors: Andrew Mark Wurtenberger, Olathe, KS (US); Chaitanya Chukka, Overland Park, KS (US); Patrick Jacob Schmidt, Basehor, KS (US); Matthew Masters, Greenfield, IN (US)

(73) Assignee: Sprint Communications Company L.P., Overland Park, KS (US)

( * ) Notice: Subject to any disclaimer, the term of this patent is extended or adjusted under 35 U.S.C. 154(b) by 450 days.

(21) Appl. No.: 15/056,025

(22) Filed: Feb. 29, 2016

(51) Int. Cl.
*H01Q 3/34* (2006.01)
*H01Q 3/36* (2006.01)
*H01Q 1/12* (2006.01)
*H01Q 1/24* (2006.01)

(52) U.S. Cl.
CPC ............... *H01Q 3/36* (2013.01); *H01Q 3/34* (2013.01); *H01Q 1/1242* (2013.01); *H01Q 1/246* (2013.01)

(58) Field of Classification Search
CPC .. H01Q 3/02; H01Q 3/04; H01Q 3/06; H01Q 3/08; H01Q 3/10; H01Q 3/34; H01Q 3/36
See application file for complete search history.

(56) References Cited

U.S. PATENT DOCUMENTS

| | | | | |
|---|---|---|---|---|
| 2003/0098816 | A1* | 5/2003 | Pleva | G01S 7/032 343/853 |
| 2007/0030208 | A1* | 2/2007 | Linehan | H01Q 1/246 343/757 |
| 2007/0205955 | A1* | 9/2007 | Korisch | H01Q 1/246 343/853 |
| 2014/0055302 | A1* | 2/2014 | Jia | H01Q 3/34 342/372 |

FOREIGN PATENT DOCUMENTS

EP     2363918 A1 *  9/2011  ............. H01Q 1/246

OTHER PUBLICATIONS

Rabinovich, V. et al., "Typical Array Geometries and Basic Beam Steering Methods", Chapter 2, Antenna Arrays and Automotive Applications, Springer Science and Business Media, New York, USA, 2013, pp. 23-54.

(Continued)

*Primary Examiner* — Daniel Munoz

(57) ABSTRACT

The invention is directed to methods and systems for adjusting the vertical beam width of an imbalanced antenna. In one embodiment, first and second antenna arrays are imbalanced because one of the arrays has at least one more radiating element than the other. The additional gain created by additional radiating element(s) distorts the beam and alters the coverage area of the corresponding array, in embodiments. The tilt of the array having at least one more additional radiating element(s) is modified using phase shifting technology and based on the tilt of the array having fewer elements. By modifying tilt of the array having at least (Continued)

one more additional radiating element(s), the upper 3 dB points of the first and second array may be aligned to correct for the distorted beam and altered coverage area between the first and second arrays.

18 Claims, 8 Drawing Sheets

(56) References Cited

OTHER PUBLICATIONS

Dietrich, Jr., Carl B., "Antenna Arrays and Beamforming", Chapter 3 of doctoral dissertation entitled "Adaptive Arrays and Diversity Antenna Configurations for Handheld Wireless Communication Terminals," Published Apr. 26, 2000, 24 pages. Available at: http://scholar.lib.vt.edu/theses/available/etd-04262000-15330030/unrestricted/ch3.pdf.
Haynes, Toby, "A Primer on Digital Beamforming", Spectrum Signal Processing, Mar. 26, 1998, 15 pages. Available at: http://www.spectrumsignal.com/publications/beamform_primer.pdf.
"Switched and Sectored Beamforming," Web page <http://www.comm.utoronto.ca/~rsadve/Notes/SwitchedBeam.pdf>, 13 pages, Apr. 11, 2016, retrieved from Internet Archive Wayback Machine <https://web.archive.org/web/20160411011115/http://www.comm.utoronto.ca/~rsadve/Notes/> on May 30, 2018.

* cited by examiner

SYSTEMS AND METHODS FOR ADJUSTING VERTICAL BEAM WIDTH

BRIEF SUMMARY

A high-level overview of various aspects of the invention is provided here for that reason, to provide an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, methods and systems for adjusting vertical beam width for imbalanced antenna arrays. Additional radiating elements may be added to a receiver-only array to create an uplink-downlink imbalance (e.g., link budget imbalance) with a transceiver array having fewer radiating elements. The additional gain available on the less regulated downlink channels of the receiver-only array may be exploited; however, the additional gain alters the vertical beam width of the receiver-only array. The altered vertical beam width is such that the receiver-only array and the transceiver array have different coverage areas, in some embodiments. The methods and systems described herein bring the vertical beam width of the receiver array into alignment with the transceiver array, so that the receiver array has the same or similar coverage area of the transceiver array, in embodiments. Phase-shifting radiating elements of the receiver-only array may be used to steer a corresponding beam toward a transceiver array beam. In this way, the additional gain provided by an imbalanced antenna array may be utilized with minimal or reduced negative coverage area impacts.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
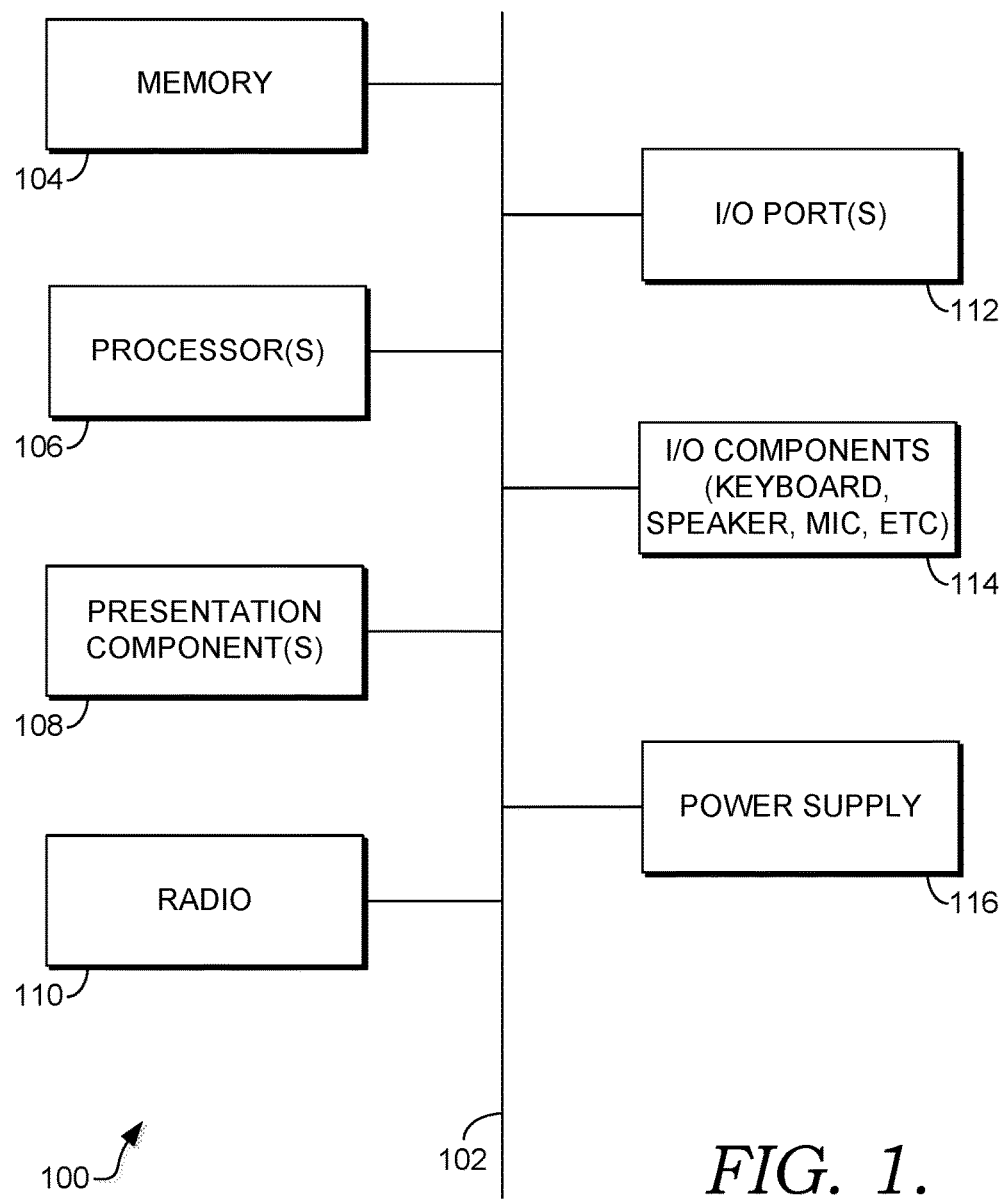
FIG. 1 depicts an exemplary computing device according to an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3GPP Third Generation Partnership Project
BTS Base Transceiver Station
CDMA Code Division Multiple Access
CD-ROM Compact Disc Read-Only Memory
DS1 Digital Signal 1
DVD Digital Versatile Disc
E1 E-carrier signal 1
EEPROM Electronically Erasable Programmable Read-Only Memory
eHRPD Enhanced High Rate Packet Data
eNodeB Evolved Node B
E-UTRA Evolved Universal Terrestrial Radio Access
EVDO Evolution Data Optimized
FDD Frequency Division Duplex
GPS Global Positioning System
GSM Global System for Mobile Communications
HRPD High Rate Packet Data
IEEE Institute of Electrical and Electronics Engineers
IPv4 Internet Protocol version 4
IPv6 Internet Protocol version 6
LPP Long Term Evolution Positioning Protocol
LTE Long Term Evolution
PPS Pulse Per Second
PTP Precision Timing Protocol
RAM Random-Access Memory
RF Radio Frequency
RNC Radio Network Controller
ROM Read-Only Memory
SyncE Synchronous Ethernet
TDD Time Division Duplex
TDM Time Division Multiplex
UDP User Datagram Protocol
WAN Wide Area Network
Wi-Fi Wireless Fidelity
WiMAX Worldwide Interoperability for Microwave Access Further, various technical terms are used throughout this description. A definition of such terms can be found in, for example, Newton's Telecom Dictionary by H. Newton, 27th Edition (2013) or 3GPP TS 36.355 version 9.0.0 Release 9. These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media. It will further be understood that the present invention may be implemented as hard-coded into the mechanical design of antenna components, may be built into a base station, may be integrated in the design of a phase-shifting network, and/or may be built in to the logic of an actuator.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer storage media and communications media.

Computer storage media, or machine-readable media, include media implemented in any method or technology for storing information. Examples of stored information include computer-useable instructions, data structures, program modules, and other data representations. Computer storage media include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components may store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Embodiments of the present invention are directed toward a method for adjusting beam width of imbalanced arrays. The method identifies a degree of tilt of a first beam of a first array, in one embodiment. The method also references a predetermined value for a second array based on the degree of tilt of the first beam, in embodiments. The first array and the second array each comprise a plurality of radiating elements, generally. However, the second array comprises at least one more radiating element than the first array, in some embodiments. An indication of the predetermined value for the second array is communicated, according to embodiments of the method. The predetermined value, in embodiments, modifies a degree of tilt of the second beam of the second array. The second beam is modified by shifting a phase of one or more of the plurality of radiating elements of the second array, in some embodiments.

In another aspect of the present invention, computer-readable media are provided. The computer-readable media generally have computer-executable instructions embodied thereon that, when executed, perform a method for adjusting beam width. The method facilitated by the computer-readable media having instructions identifies a tilt value corresponding to a degree of tilt of a first beam of a first array, in embodiments. The first array may comprise a plurality of radiating elements. The method continues by referencing a plurality of predetermined tilt values for a second beam of a second array, in embodiments. The second array comprises another plurality of radiating elements, in embodiments; however, the second array comprises at least one more radiating element than the first array. A first predetermined tilt value of the plurality of predetermined tilt values is identified, in embodiments. The first predetermined tilt value is different than the tilt value of the first beam, but the first predetermined tilt value corresponds to the degree of tilt of the first beam, generally. The method modifies a degree of tilt of the second beam of the second array from a first position to a second position based on the first predetermined tilt value that corresponds to the degree of tilt of the first beam of the first array, in embodiments.

In a third aspect of the present invention, a system for adjusting beam width is provided. In embodiments, the system comprises an actuator configured to drive electric tilt of a plurality of radiating elements. The system includes an antenna having a first array and a second array, in embodiments. Each of the first and second arrays has one or more radiating elements; however, the second array has at least one more radiating element than the first array, in embodiments. In some embodiments, the second array is a receiver-only array. The system further comprises a controller. In embodiments, the controller is configured to reference a plurality of predetermined tilt values for a second array and to communicate instructions to the actuator to drive the electric tilt of the one or more radiating elements of the second array based on at least one of the plurality of predetermined tilt values.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 102 that directly or indirectly couples various components together including memory 104, a processor 106, a presentation component 108 (if applicable), a radio 110, input/output (I/O) ports 112, input/output (I/O) components 114, and a power supply 116.

Memory 104 might take the form of memory components previously described. Thus, further elaboration will not be provided here, only to say that memory 104 may include any type of medium that is capable of storing information (e.g., a database), such as a tangible medium. A database may be any collection of records. In one embodiment, memory 104 includes a set of embodied computer-executable instructions that, when executed, facilitate various aspects disclosed herein. These embodied instructions will variously be referred to as "instructions" or an "application" for short. Processor 106 might actually be multiple processors that receive instructions and process them accordingly. Presentation component 108 includes the likes of a display, a speaker, as well as other components that may present information (e.g., a display, a screen, a lamp (LED), or even lighted keyboards) through visual, auditory, and/or tactile cues.

The communications device 100 includes a radio 110 that facilitates communication with a wireless telecommunications network. Illustrative wireless telecommunications technologies include CDMA, GPRS, TDMA, GSM, and the like. Radio 110 might additionally or alternatively facilitate other types of wireless communications including Wi-Fi, WiMAX, LTE, or other VoIP communications. As can be appreciated, in various embodiments, radio 110 may be configured to support multiple technologies, and/or multiple radios may be utilized to support multiple technologies.

Input/output (I/O) ports 112 might take on a variety of forms. Illustrative I/O ports include a USB jack, stereo jack, infrared port, proprietary communications ports, and the like. Input/output (I/O) components 114 include items such as keyboards, microphones, speakers, touchscreens, and any other item usable to directly or indirectly input data into the communications device 100. Power supply 116 includes items such as batteries, fuel cells, or any other component that may act as a power source to supply power to the communications device 100.

Figure 2:
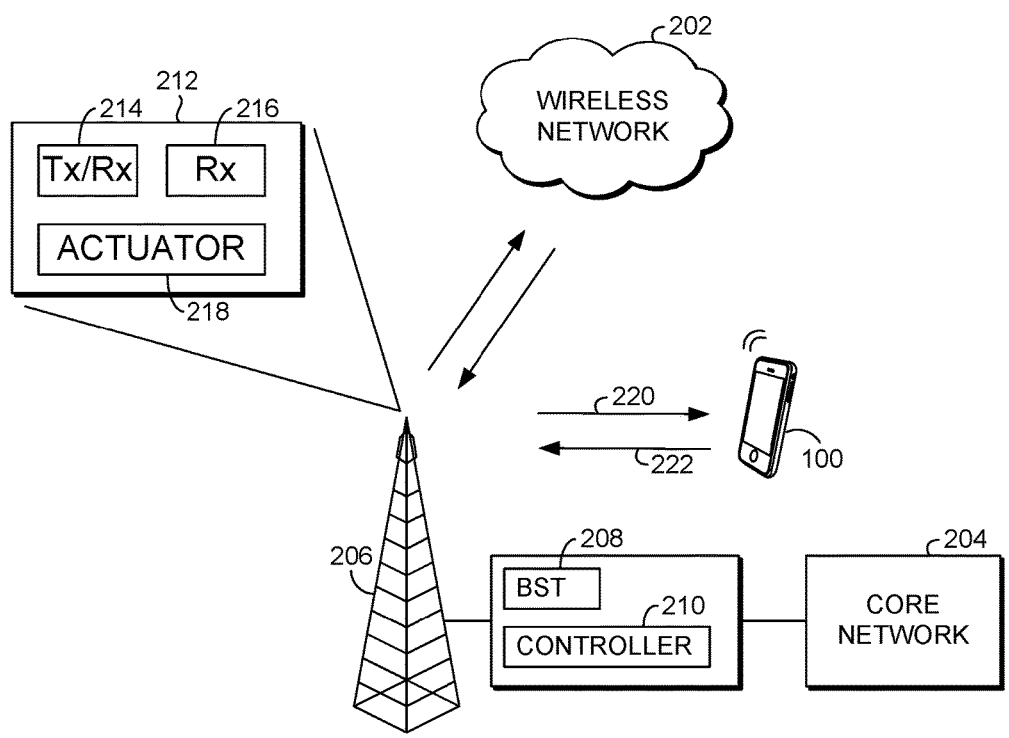
FIG. 2 depicts a wireless communications system in accordance with an embodiment of the invention.

Turning now to FIG. 2, a wireless communications system 200 in accordance with one embodiment of the invention is illustrated. The wireless communications system 200 includes a wireless communications network 202, a core network 204 that may support the wireless communications network 202, and a radio tower 206. The radio tower 206 may wirelessly communicate with the communications device 100 shown in exemplary FIG. 1, and may enable the communications device 100 to communicate with other mobile devices, for example, over the wireless communications network 202 and/or through the core network 204. The radio tower 206 may be a structure designed to support one or more antennas for telecommunications and/or broadcasting. The radio tower 206 is not intended herein to be limited to any shape and/or structure. For example, the radio tower 206 may be a building or pole on which an antenna is installed. In other embodiments, a mobile radio tower may be employed.

The radio tower 206 includes or is associated with a base station 208. The radio tower 206 may be communicatively coupled to a base station 208, in one embodiment. In embodiments, the base station 208 may be a wireless communications station that is installed at a fixed location, such as near the base of the radio tower 206. In other embodiments, base station 208 may be a mobile base station. The base station 208 may be a NodeB or an eNodeB used to communicate via the wireless communications network 202. For example, the base station 208 may facilitate wireless communication between the communications device 100 and the core network 204. The communications device 100 may be a device that uses the wireless communications network 202. The communications device 100 may take on a variety of forms, such as a personal computer (PC), a laptop computer, a tablet, a mobile phone, a personal digital assistant (PDA), a server, or any other device that is capable of communicating with other devices using the wireless communications network 202 and/or the core network 204. The wireless communications network 202 might be a single network or multiple networks, as well as being a network of networks. Such one or more networks might comprise, for example, a cable network, an intranet, the Internet, a wireless telecommunications network, a wireless network (e.g., Wi-Fi), or a combination thereof or portions thereof. The wireless communications network 202 may be supported by and/or otherwise function as a portion of the core network 204, in some embodiments.

The radio tower 206 of FIG. 2 may include or communicate with a controller 210. The controller 210 may be positioned locally at the radio tower 206 and/or integrated therein. Additionally or alternatively, the controller 210 may be positioned locally with the base station 208 and/or integrated into the base station 208. The controller 210, in some embodiments, may be located remote from the radio tower 206 and/or the base station 208 so that the controller is part of or within the core network 204. The controller 210 may work in tandem with the base station 208 to control or manage the functions of the radio tower 206 and radio tower components. As such, the controller 210 may include one or more of memory, processors, computer-readable media, radio, I/O ports, I/O components, a power supply, or other components, such as those exemplary components illustrated in FIG. 1. In one embodiment, the controller 210 is a computer-program product that includes computer-useable instructions embodied on one or more computer-readable media. In another embodiment, the controller 210 includes one or more program modules.

The controller 210 may communicate with the radio tower 206, the base station 208, and/or the core network 204 using any number of tangible physical paths. A physical path, as used herein, refers to a hardwired path configured for transmitting signals and/or data. Exemplary physical paths include a coaxial cable path, a cable path, and a fiber optic cable. These examples are included herein for illustration only and should not be construed as limiting.

The radio tower 206 includes an antenna 212. The antenna 212 is generally positioned at or near the top of the radio tower 206, in some embodiments, albeit such placement is not intended to limit the scope of the embodiments of the invention. The antenna 212 may be used for telecommunications, in some embodiments. In embodiments, the antenna 212 may be a device that is specifically configured to convert radio frequency waves into power or current (e.g., electrical current such as alternating current). Additionally or alternatively, the antenna 212 may be a device that is specifically configured to convert power or current into radio frequency waves (e.g., a wireless signal or a radio frequency field), in embodiments.

The antenna 212 may comprise one or more antenna arrays. An antenna array comprises one or more radiating elements, in embodiments. In a further embodiment, an antenna array comprises a plurality of radiating elements. As used herein, the terms "antenna array" and "array" may be used interchangeably and the terms "antenna radiating element" and "radiating element" may be used interchangeably. In some embodiments, the antenna 212 may be a phased array. A phased array is an array of antennas in which the phase of signals emitted and/or received by each antenna in the phase array is shifted relative to each neighboring antenna in the phased array, in various embodiments. As used herein, neighboring antennas are physically located next to one another or in physical proximity to one another at the radio tower 206, for example. For example, a first antenna in the array may be configured to receive and/or emit signals at phase zero; a second antenna neighboring the first antenna may be configured to receive and/or emit signals at a phase shift of 0.7 $\pi$ compared to the first antenna; a third antenna neighboring the second antenna may be configured to receive and/or emit signals at a phase shift of 1.4 $\pi$ relative to the first antenna; and a fourth antenna may be configured to receive and/or emit signals at a phase shift of 2.1 π relative to the first antenna. It will be understood that the phase and/or phase shift of a radiating element affects the timing of a signal received and/or a signal emitted. The number of antennas and the phase shift increments between each of the antennas used herein are merely illustrative and should not be considered limiting. Any number of antennas and any number of arrays are considered to be within the scope of this disclosure and the examples used herein are not limiting. As such, number and kind of incremental phase shifts of each antenna in an array may be employed and are considered to be within the scope of this disclosure; however, these examples should not be construed as limiting. Exemplary phase shift arrays include linear arrays, circular arrays, and three-dimensional arrays.

In one embodiment, the antenna includes at least one array configured to transmit and receive wireless signals, such as transceiver array 214. Additionally or alternatively, the antenna 212 includes at least one array configured to only receive wireless signals, such as receiver-only array 216. In embodiments, the transceiver array 214 is an array configured to transmit and receive wireless signals. In embodiments, the receiver-only array 216 is an array configured to only receive wireless signals, for the purposes of this description. The receiver-only array 216 may have the capabilities to transmit wireless signals when configured differently; however, the configuration of the receiver-only array may disable or prevent wireless signal transmission, or may enable the receiver-only array to ignore or disregard instructions to transmit or broadcast wireless signals, in some further and/or alternative embodiments.

The antenna 212 may further include an actuator 218. In one embodiment, the actuator 218 is an electronic actuator. The actuator 218 is configured to control one or more of the transceiver array 214 and the receiver-only array 216, in embodiments. In further embodiments, the actuator 218 is configured to control phase and/or phase shift of one or more of the radiating elements of the transceiver array 214 and/or the receiver-only array 216, and/or the plurality of radiating elements. For example, the actuator 218 may control one or more electronic phase shifters. In another example, the actuator 218 may comprise one or more electronic phase shifters. In yet another example, the actuator may control and/or comprise a plurality of electronic phase shifters. In one example, the actuator controls a plurality of electronic phase shifters, each electronic phase shifter corresponding to one radiating element of an array. In another example, each electronic phase shifter may control more than one radiating element. In another example, the actuator 218 controls all of the radiating elements of the transceiver array 214 and/or the receiver-only array 216 and any corresponding electronic phase shifters. The actuator 218, in some embodiments, may include or control a power splitter or other components relevant to phased array systems. Although the actuator 218 is shown as part of the antenna 212, it will be understood that the actuator may be a separate and distinct component that operates between the antenna 212 (e.g., transceiver array 214 and/or receiver-only array 216) and a signal source (e.g., a radio transmitter) and/or power source, for example.

Wireless signals are transmitted and/or received via the antenna and/or antenna arrays at the radio tower 206. For example, the radio tower 206 may wirelessly communicate with the communications device 100 shown in exemplary FIG. 1. In a telecommunications or cellular network context, the transmission of a wireless signal 220 from the radio tower 206 to the communications device 100 is a downlink transmission, and the transmission of a wireless signal 222 from the communications device 100 to the radio tower 206 is an uplink transmission, generally. Accordingly, when the communications device 100 transmits wireless signals to the radio tower 206, said wireless signals are transmitted over a corresponding uplink channel, for example. The uplink channel wireless signals from the communications device 100 may be received by the receiver-only array 216 of the radio tower 206, for example. In some embodiments, the receiver-only array 216 receives wireless communications and signals over the uplink channel, such that the receiver-only array 216 "listens" to the uplink channel(s).

Separate radio frequency bands may be allocated to uplink channels and downlink channels, in some embodiments. For example, the radio frequency band(s) of uplink channels may comprise frequencies that are higher relative to radio frequency band(s) of downlink channels. The radio frequency band(s) of uplink transmissions and/or downlink transmissions may be controlled, regulated, and/or otherwise managed by the Federal Communications Commission (FCC) in the United States. For example, the FCC may limit the radiating power of downlink transmissions. As such, there is an opportunity to exploit the less regulated environment regarding receipt of uplink transmissions, for example.

Figure 3:
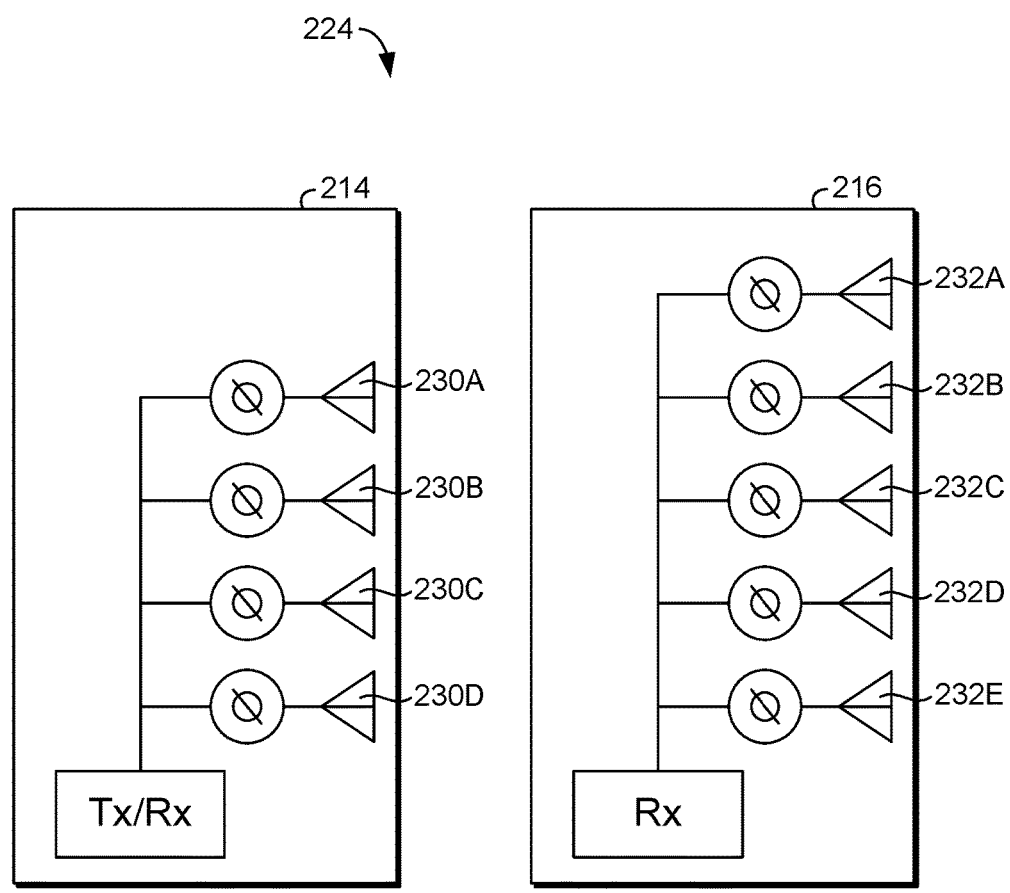
FIG. 3 depicts an imbalanced antenna in accordance with an embodiment of the invention.

FIG. 3 depicts an imbalanced antenna 224, in accordance with an embodiment of the invention. In one embodiment, the imbalanced antenna 224 is the antenna 212 of exemplary FIG. 2. The imbalanced antenna 224 is one example and the number of components, the types of components, and any relationship between the number and/or type of components shown therein is merely shown therein is merely illustrative in nature and should not be construed as limiting. Additionally, one or more components and other types of component may be present in various embodiments that have been omitted in the illustrative example of FIG. 3.

As shown in the embodiment of FIG. 3, the imbalanced antenna 224 comprises two arrays, the transceiver array 214 and the receiver-only array 216. The transceiver array 214 is configured to transmit and receive wireless signals, in embodiments. Accordingly, the transceiver array 214 may be capable of transmitting wireless signals over a downlink channel via the radiating elements 230A, 2306, 230C, and 230D. In some embodiments, the transceiver array 214 may be capable of receiving wireless signals over the uplink channel as well. The receiver-only array 216 may be configured to only receive wireless signals over an uplink channel via the radiating elements 232A, 232B, 232C, 232D, and 232E. The receiver-only array 216 may be generally configured differently from the transceiver array 214, in some embodiments, such that that the receiver-only array 216 receives wireless signals but does not transmit wireless signals.

As shown in FIG. 3, the transceiver array 214 and the receiver-only array 216 are imbalanced compared to one another. The imbalance of the transceiver array 214 and the receiver-only array 216, which comprise the imbalanced antenna 224, refers to an uplink versus downlink balance. The uplink-downlink imbalance results from the transceiver array 214 comprising fewer radiating elements than the receiver-only array 216. For example, the transceiver array 214 shown in exemplary FIG. 3 includes four radiating elements (e.g., radiating elements 230A, 2306, 230C, and 230D) whereas the receiver-only array 216 includes five radiating elements (e.g., radiating elements 232A, 232B, 232C, 232D, and 232E). The number of radiating elements shown in FIG. 3 is merely exemplary and any number of radiating elements may be utilized, such that FIG. 3 should not be construed as limiting.

In alternative embodiments, an uplink-downlink imbalance results from the transceiver array 214 powering fewer radiating elements or using fewer radiating elements than the receiver-only array 216. For example, the transceiver array 214 and the receiver-only array 216 may each include the same number of radiating elements; however, the transceiver array 214 may inactivate one or more radiating elements in order to manufacture an uplink-downlink imbalance. The transceiver array 214 may further inactivate one or more of the corresponding plurality of radiating elements permanently or non-permanently to create an artificial uplink-downlink imbalance, in another example. The inactivation or non-use may be continuous, intermittent, automatic, and/or selective during operation of the transceiver array 214, in various embodiments.

Returning to FIG. 3, the uplink-downlink imbalance corresponds to a difference in gain of the transceiver array 214 compared to the receiver-only array 216. For each additional radiating element, an array experiences or produces additional gain. Additional gain distorts the main beam produced by the array. More specifically, added gain distorts the main beam by narrowing the vertical beam width and lengthening the distance the main beam extends from the radio tower 206 (e.g., "squeezing the balloon"). Thus, when the receiver-only array 216 has more radiating elements than the transceiver array 214, the main beam produced by the receiver-only array 216 may have a different cross section than the main beam produced by the transceiver array 214, as will be illustrated in the following figures.

Figure 4A:
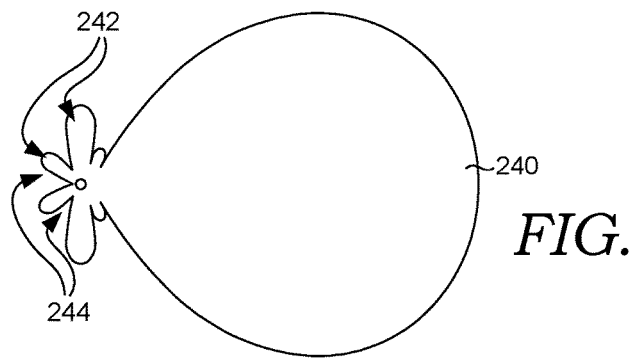
FIG. 4A depicts a horizontal cross section of a beam produced by an antenna in accordance with an embodiment of the present invention.

Turning to FIG. 4A, a horizontal cross section of a profile pattern of a beam produced by the transceiver array 214 is illustrated in accordance with an embodiment of the present invention. The horizontal cross section of the profile pattern also corresponds to a "top down" view of the main beam produced by the transceiver array 214. The profile pattern of the transceiver array 214 includes a transceiver array beam 240 (e.g., a "main beam"), side lobes 242, and nulls 244, for example. The side lobes 242 and nulls 244 shown in FIG. 4A are merely illustrative examples, and may vary in number, shape, placement, and location, for example. For simplicity, "main beam" and "beam" are referred to interchangeably herein. The transceiver array beam 240 may be produced by the radiating elements 230A, 230B, 230C, and 230D of the transceiver array 214. The transceiver array beam 240 corresponds to a coverage area produced by the transceiver array 214 of the radio tower 206, in embodiments.

Figure 4B:
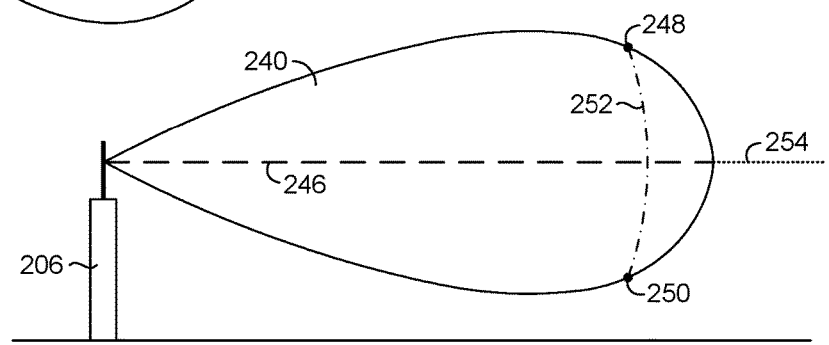
FIG. 4B-D depicts a vertical cross section of a beam at various tilt positions, produced by an antenna in accordance with an embodiment of the present invention.
Figure 4C:
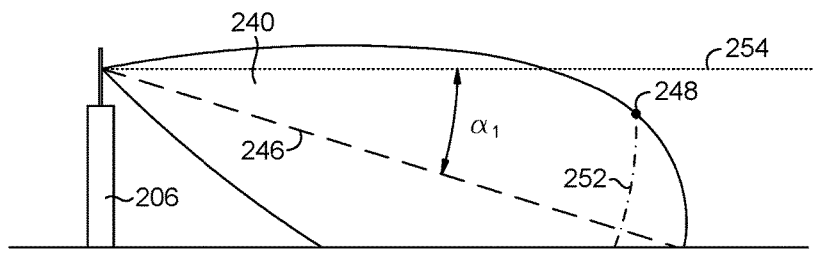
Figure 4D:
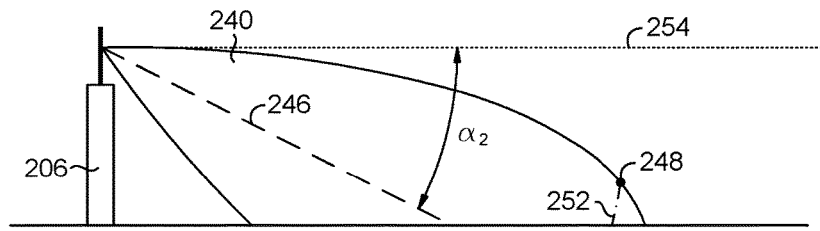

In FIGS. 4B-4D, a vertical cross section of a profile pattern of the beam of the transceiver array 214 of the radio tower 206 is shown, in accordance with an embodiment of the present invention. The transceiver array beam 240 includes a transceiver array beam boresight 246, a transceiver array beam first vertical marker 248, a transceiver array beam second vertical marker 250, and a transceiver array vertical beam width 252. Generally a boresight is a central imaginary axis of a three-dimensional main beam that is projected outward from an array at a radio tower through the center of the main beam. When a main beam is viewed in cross section, the boresight may bisect the main beam into symmetrical halves.

As shown in exemplary FIG. 4B, the transceiver array 214 is positioned at a neutral position, which corresponds to a zero degree tilt, in one embodiment. The neutral position may be defined by an axis 254 that is imaginary that runs parallel to the ground, and/or which corresponds to a horizontal plane through which the cross section of FIG. 4B is observed, for example. In one embodiment, when the transceiver array 214 is in a neutral position, the transceiver array 214 corresponds to a zero degree of tilt with respect to the axis 254. And, when the transceiver array 214 is in a neutral position, the transceiver array beam boresight 246 is aligned with the axis 254, in one embodiment. A degree of tilt may include any degree measurement within 360 degrees.

Figure 6:
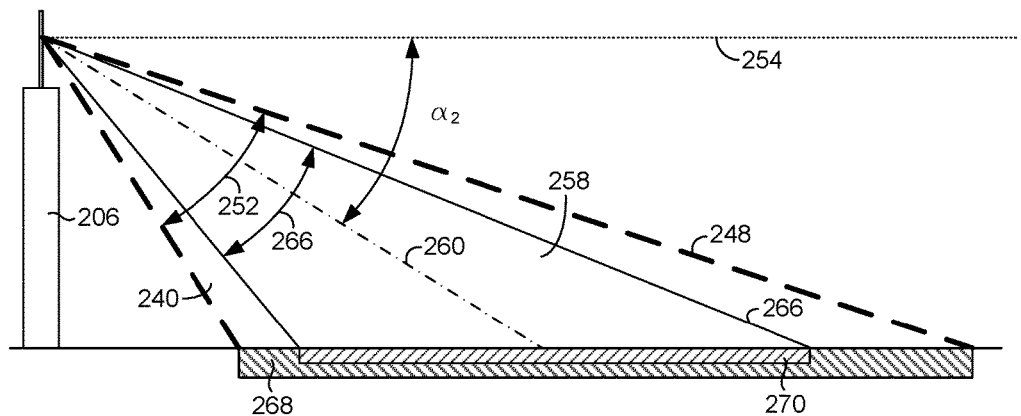
FIG. 6 depicts an imbalanced antenna in accordance with an embodiment of the present invention.
Figure 7:
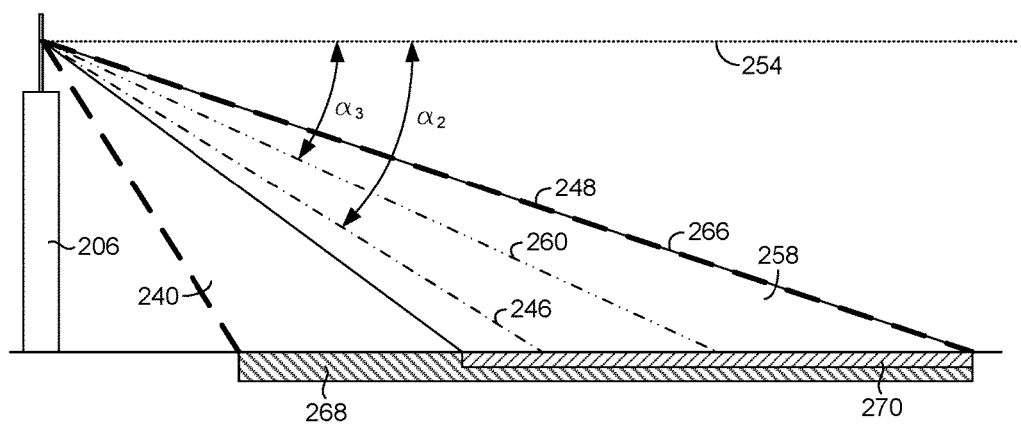
FIG. 7 depicts an imbalanced antenna in accordance with an embodiment of the present invention.

The transceiver array vertical beam width 252 is measured from the transceiver array beam first vertical marker 248 to the transceiver array beam second vertical marker 250, in embodiments. The transceiver array beam first vertical marker 248 and the transceiver array beam second vertical marker 250 correspond to half power points of the transceiver array beam 240, generally. The half power point of an antenna or antenna array's main beam is the angle off of the boresight at which the antenna/antenna array gain has fallen 3 decibels (dB) below the peak gain, in embodiments. Generally, the half power point refers to and/or corresponds to a 3 decibel (dB) marker or a 3 dB point. Therefore, in one embodiment, a transceiver array beam first vertical marker 248 corresponds to an upper 3 dB point of the transceiver array beam 240 and the transceiver array beam second vertical marker 250 corresponds to a lower 3 dB point of the transceiver array beam 240. The terms "half power point" and "3 dB marker" may be used interchangeably herein, based on this understanding. It will further be understood that the term "point" may include a range of points, area, and/or a portion of a beam, and does not limit the vertical markers to a single point in space. Rather, the vertical markers are shown as points in FIGS. 4B-D for simplicity and clarity in the discussion of the beam and beam shape, but the vertical markers may also be represented with lines or vectors that denote half power locations of the beam, as shown in the embodiments of FIGS. 6-7. When a beam is redirected and/or tilted with respect to the axis 254, the 3 dB markers (e.g., point or lines) transition along with the beam as well, in some embodiments.

Generally, a beam may be tilted up or down relative to the axis 254 and/or the ground, in embodiments. The tilt angle or degree of tilt may be adjusted, modified, or otherwise changed by modifying aspects of one or more radiating elements forming the beam of an antenna array, in some embodiments. In one embodiment, a beam may be tilted upward or downward, relative to the axis 254, by shifting the phase of one or more radiating elements producing said beam.

For example, to change the degree of tilt of the transceiver array 214, the plurality of radiating elements 230A, 230B, 230C, and 230D may be modified using an actuator, such as actuator 218 shown in FIG. 2. The actuator, at the direction of a controller such as controller 210, for example, may shift a phase of the plurality of radiating elements 230A, 230B, 230C, and 230D of the transceiver array 214, in one embodiment. By shifting the phase of each of the plurality of radiating elements 230A, 230B, 230C, and 230D of the transceiver array 214, the degree of tilt of the transceiver array beam 240 may be modified, for example. As such, a controller and/or an actuator may be used to control the degree of tilt of a beam produced by radiating elements of an array, for example.

For example, a first antenna in the transceiver array 214 having been initially configured to receive and/or emit signals at phase 0 to produce a main beam in a neutral position, may be shifted to a phase of $0.7\,\pi$; a second antenna neighboring the first antenna having been initially configured to receive and/or emit signals at phase $0.7\,\pi$ compared to the first antenna in order to produce a main beam in a neutral position, may be shifted to a phase of $1.4\,\pi$; and a third antenna neighboring the second antenna having been initially configured to receive and/or emit signals at a phase 1.4 π relative to the first antenna in order to produce a main beam in a neutral position, may be shifted to a phase of 2.1 π; and a fourth antenna having been initially configured to receive and/or emit signals of 2.1 π relative to the first antenna in order produce a main beam in a neutral position, may be shifted to a phase of 2.8 π. It will be understood that the phase shifts used herein are examples only and should not be construed as limiting. Rather, these examples are illustrations that are used herein to produce a clear and simplified description of the claimed embodiments of the invention.

As shown in FIGS. 4C and 4D, for example, the transceiver array beam 240 is tilted and/or has a degree of tilt that is not at zero degrees with respect to the axis 254. The transceiver array beam boresight 246 is located at a first degree of tilt α1 in the embodiment of FIG. 4C, and the transceiver array beam boresight 246 is located at a second degree of tilt α2 in the embodiment of FIG. 4D. The first degree of tilt α1 and the second degree of tilt α2 refer to angles measured from the transceiver array beam boresight 246 to the axis 254, in one embodiment. In another embodiment, the first degree of tilt α1 refers to an angle measured from the transceiver array beam boresight 246 in the neutral position shown in FIG. 4B to the transceiver array beam boresight 246 when the transceiver array beam 240 is in a first position at a first degree of tilt α1, as shown in FIG. 4C. In yet another embodiment, the second degree of tilt α2 refers to an angle measured from the transceiver array beam boresight 246 in the neutral position shown in FIG. 4B to the transceiver array beam boresight 246 when the transceiver array beam 240 is in a second position at a second degree of tilt α2, as shown in FIG. 4D.

Figure 5A:
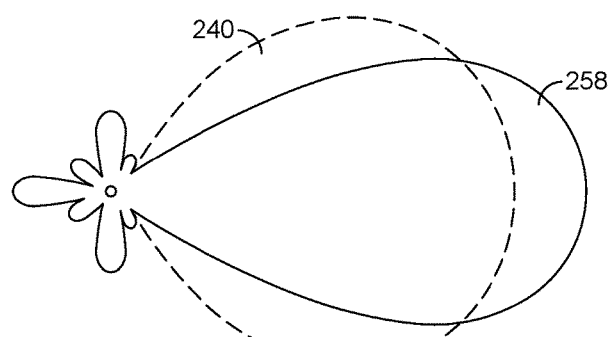
FIG. 5A depicts a horizontal cross section of a beam produced by an antenna in accordance with an embodiment of the present invention.

In FIG. 5A, a horizontal cross section of a profile pattern of the beam produced by the receiver-only array 216 is illustrated in accordance with an embodiment of the present invention. The horizontal cross section of the profile pattern also corresponds to a "top down" view of the main beam produced by the receiver-only array 216. The receiver-only array beam 258 is shown in solid lines while the transceiver array beam 240 is shown using broken lines. As illustrated, the receiver-only array 216 produces a receiver-only array beam 258 which experiences distortion due to the increased number of radiating elements. This distortion (e.g., narrowing of the vertical beam width and lengthening the distance the beam extends from the radio tower 206) is not present in the transceiver array beam 240, as shown in the embodiment of FIG. 5A.

Figure 5B:
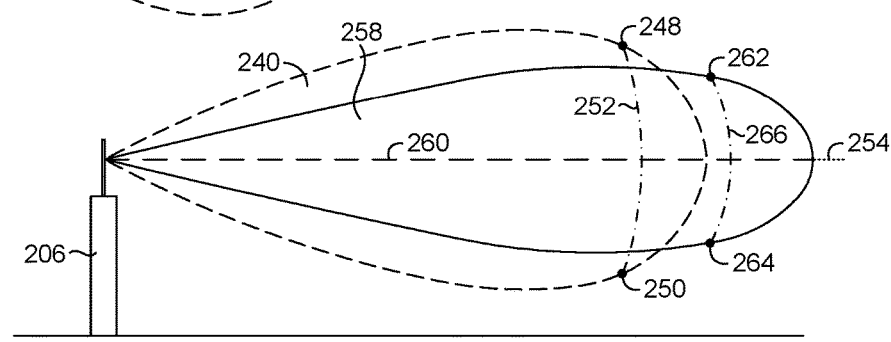
FIG. 5B-D depicts a vertical cross section of a beam at various tilt positions, produced by an antenna in accordance with an embodiment of the present invention.
Figure 5C:
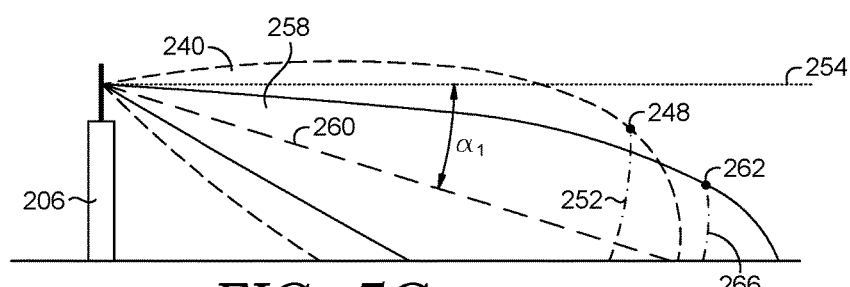
Figure 5D:
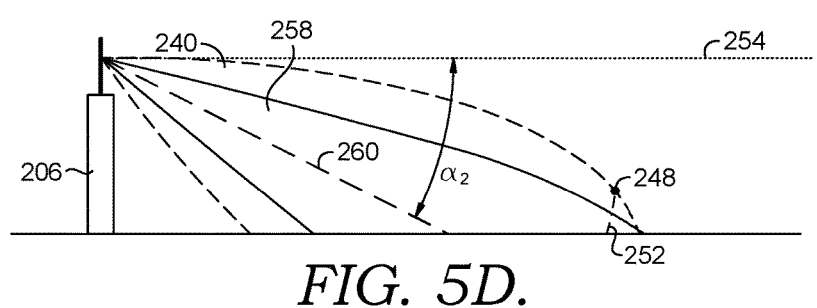

Continuing to FIGS. 5B-5D, a vertical cross section of a profile pattern of the beam of the receiver-only array 216 of the radio tower 206 is shown, in accordance with an embodiment of the present invention. The receiver-only array beam 258 includes a receiver-only array beam boresight 260, a receiver-only array beam first vertical marker 262, a receiver-only array beam second vertical marker 264, and a receiver-only array vertical beam width 266.

The receiver-only array vertical beam width 266 may be narrower than, or less than, the transceiver array vertical beam width 252, due to the additional radiating elements present in the receiver-only array 216. Thus, the distance from the receiver-only array beam first vertical marker 262 to the receiver-only array beam second vertical marker 264 is less than the distance from the transceiver array beam first vertical marker 248 to the transceiver array beam second vertical marker 250, in some embodiments. Said distances may be measured across the axis 254, for example. The narrowing of the receiver-only array vertical beam width 266 is due to the increased gain of the receiver-only array 216, in embodiments.

As shown in the embodiment of FIG. 5B, the receiver-only array beam 258 and the transceiver array beam 240 are in a neutral position such that the receiver-only array beam boresight 260 and the transceiver array beam boresight 246 are aligned with one another. The degree of tilt of the receiver-only array beam 258 may be modified, adjusted, or otherwise changed by manipulating aspects of the plurality of radiating elements 232A, 232B, 232C, 232D, and 232E, in embodiments. One or more of the plurality of radiating elements 232A, 232B, 232C, 232D, and 232E may be modified using an actuator, such as actuator 218 shown in FIG. 2. The actuator, at the direction of a controller such as controller 210, for example, may shift a phase of the plurality of radiating elements 232A, 232B, 232C, 232D, and 232E of the receiver-only array 216, in one embodiment. By shifting the phase of each of the plurality of radiating elements 232A, 232B, 232C, 232D, and 232E, the degree of tilt of the receiver-only array beam 258 may be modified, for example. As such, a controller and/or an actuator may be used to control the degree of tilt of a beam produced by radiating elements of an array, for example. In this way, respective radiating elements of the receiver-only array 216 and the transceiver array 214 may be phase shifted in order to steer the receiver-only array beam 258 and the transceiver array beam 240 together, or alone, in embodiments of the present invention. As illustrated by the embodiments shown in FIGS. 5B-5D, the alignment of the receiver-only array beam boresight 260 with the transceiver array beam boresight 246 is such that one or more actuators may be employed to tilt, together, the receiver-only array beam 258 along with the transceiver array beam 240, for example.

However, when the receiver-only array beam 258 and the transceiver array beam 240 are tilted together and are positioned at the same angle (e.g., as measured at respective boresights to the axis 254, α1 shown in FIG. 5C and α2 shown in FIG. 5D) such that the receiver-only array beam boresight 260 is aligned with the transceiver array beam boresight 246, the receiver-only array beam first vertical marker 262 is not aligned with the transceiver array beam first vertical marker 248, in some embodiments. This misalignment is due to the difference between the receiver-only array vertical beam width 266 which is narrower that the transceiver array vertical beam width 252, in such embodiments.

As shown in FIG. 6, the misalignment of the receiver-only array beam first vertical marker 262 and the transceiver array beam first vertical marker 248 impacts coverage area at the ground, in some embodiments. In exemplary FIG. 6, the receiver-only array beam 258 and the transceiver array beam 240 are placed at a second degree of tilt α2. Because of the difference in vertical beam widths (e.g., transceiver array vertical beam width 252 and receiver-only array vertical beam width 266), the transceiver array beam 240 produces a transceiver coverage area 268, whereas the receiver-only array beam 258 produces a receiver-only coverage area 270, as shown in the embodiment of FIG. 6. The transceiver coverage area 268 is larger than the receiver-only coverage area 270, in such embodiments. The reduced size of the receiver-only coverage area 270 is a result of the narrower width of the receiver-only array vertical beam width 266, compared to the transceiver array vertical beam width 252, in some embodiments. In a further embodiment, the reduced size of the receiver-only coverage area 270 is exacerbated by the degree of tilt of the receiver-only array beam 258. As the receiver-only array beam 258 is tilted downward from the axis 254 at increasing angles, the distance the receiver-only array beam 258 extends from the radio tower 206 decreases, in such embodiments. As the distance the receiver-only array beam 258 extends from the radio tower 206 decreases, the "reach" of the receiver-only coverage area 270 decreases, as shown in exemplary FIG. 6. The decreased distance of extension of the receiver-only array beam 258 of the receiver-only array 216 negatively impacts the coverage area provided to users of mobile communications devices, for example, attempting to initiate or maintain wireless communications with the radio tower 206.

This decreased distance of extension of the receiver-only array beam 258 may be reduced or corrected by independently adjusting the receiver-only array beam 258 based on a degree of tilt of the transceiver array beam 240. As shown in FIG. 7, the receiver-only array beam first vertical marker 262 may be brought into alignment with the transceiver array beam first vertical marker 248, in some embodiments. As used herein, alignment refers to a vertical overlap and/or alignment of the upper 3 dB markers of two array beams, as measured at the same or similar distance from the radio tower 206. In exemplary FIG. 7, the receiver-only array beam 258 has been modified to be placed at a third degree of tilt α3 whereas the transceiver array beam 240 is placed at a second degree of tilt α2. Generally, the third degree of tilt α3 is selected for modifying the receiver-only array 216 based on the second degree of tilt α2 of the transceiver array 214.

In various embodiments, the receiver-only array beam 258 may be steered to direct the receiver-only array beam first vertical marker 262 nearer the transceiver array beam first vertical marker 248 and/or closer to alignment with the transceiver array beam first vertical marker 248. By adjusting and/or steering the receiver-only array beam first vertical marker 262 (e.g., a 3 dB vertical marker) of the receiver-only array beam 258 nearer the transceiver array beam first vertical marker 248, the distance of extension of the receiver-only array beam 258 may be extended outward, farther away from the radio tower 206. In this way, the distance of extension of the receiver-only array beam 258 is made more similar to the distance of extension of the transceiver array beam 240, for example.

The receiver-only array beam 258 may be directed to bring the receiver-only array beam first vertical marker 262 closer to, or into, an alignment with transceiver array beam first vertical marker 248 by phase shifting one or more of the plurality of radiating elements 232A, 232B, 232C, 232C, and 232D of the receiver-only array 216. Concurrently, the plurality of the radiating elements 230A, 230B, 230C, and 230D of the transceiver array 214 do not experience the same or additional phase shifting. For example, when the transceiver array 214 receives instructions to phase shift the plurality of radiating elements 230A, 230B, 230C, and 230D to produce 5 degrees of tilt of the transceiver array beam 240, the receiver-only array 216 receives the same or similar instructions. However, due to the receiver-only array vertical beam width 266 begin narrower than the transceiver array vertical beam width 252, the receiver-only array 216 may be instructed to phase shift the plurality of radiating elements 232A, 232B, 232C, 232D, and 232E to produce 4.75 degrees of tilt of the receiver-only array beam 258, wherein 4.75 degrees of tilt aligns the receiver-only array beam first vertical marker 262 with the transceiver array beam first vertical marker 248, in some embodiments. The 4.75 degrees of tilt may be a predetermined tilt value that corresponds to the 5 degrees of tilt of the transceiver array 214. The modifications used to produce a variance in a degree of tilt of the receiver-only array beam 258 that is based on the degree of tilt of the transceiver array beam 240 are described in the following methods. In some embodiments, the following methods may be performed by executing, via one or more processors, computer-readable instructions stored on computer-readable media.

Figure 8:
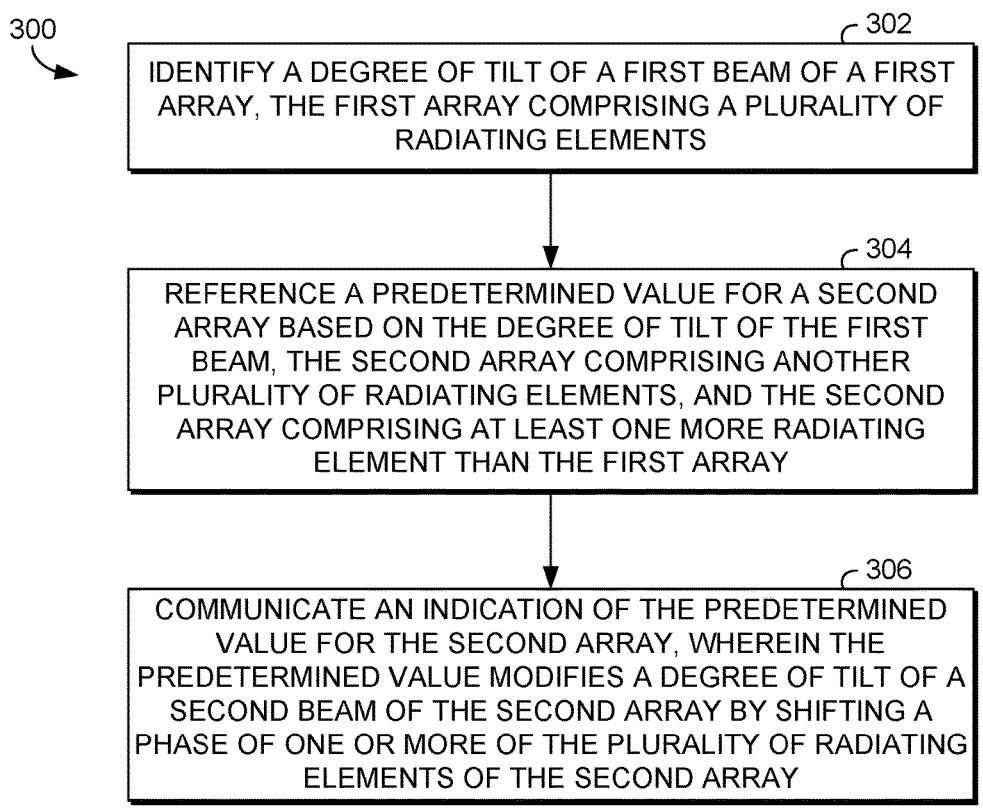
FIG. 8 provides an exemplary method for adjusting beam width in accordance with an embodiment of the present invention.

FIG. 8 depicts a method 300 for aligning beams of imbalanced arrays. The method 300 comprises identifying a degree of tilt of a first beam of a first array, at block 302. In embodiments, the first array comprises a plurality of radiating elements. In a further embodiment, the first array is a transceiver array. The method 300 may include identifying a degree of tilt of a second beam of a second array, in one embodiment. In one embodiment, the second array is a receiver-only array. Additionally, the second array may include another plurality of radiating elements. In some embodiments, the second array has at least one more radiating element than the first array. The at least one additional radiating element of the second array creates an uplink-downlink imbalance for an antenna that comprises the first and second arrays, in such an embodiment. Alternatively, the second array and the first array may each include the same number of radiating elements; however, the first array may inactivate one or more radiating elements in order to manufacture an uplink-downlink imbalance.

Additionally or alternatively, the method 300 may determine whether or not the first beam of the first array and the second beam of the second array share the same or a similar degree of tilt, for example, relative to an axis, such as axis 254 of FIG. 6. The degree of tilt may correspond to, describe, or quantify an angle measured from a beam's boresight to a horizontal axis, for example. The method 300 might determine a vertical beam width of the first beam of the first array and a vertical beam width of the second beam of the second array, in some embodiments. The beam width of an array may be determined based on 3 dB points, half power points, the number of radiating elements, the type of radiating elements, gain, power, and the like. In some embodiments, the method 300 may determine that a vertical beam width of the first array is not the same as a vertical beam width of a second array. In one embodiment, the vertical beam width of the second beam of the array is narrower than the vertical beam width of the first beam of the first array. In such an embodiment, the second beam's vertical beam is distorted by increased gain resulting from the second array having at least one additional active radiating element than the first array.

At block 304, a predetermined value for a second array is referenced. The predetermined value for the second array may be referenced based on the degree tilt of the first beam, as identified by the method 300. The predetermined value referenced may be retrieved or obtained using the identified degree of tilt of the first beam, in one embodiment. In addition, the predetermined value referenced may be identified based on one or more of a radio frequency band, site morphology, array manufacturer, height of placement of an array, and array type, for example. In another embodiment, the degree of tilt of the first beam is communicated to a database and used to reference one or more predetermined tilt values associated with the degree of tilt of the first beam, but that are specifically applicable with regard to the second array having the additional active radiating element. In some embodiments, the method 300 automatically identifies the predetermined value for the second array.

In another embodiment, the method 300 identifies the predetermined value based on a manual trigger, such as a user (e.g., radio tower technician) initiated performance of the method 300. The method 300 may identify, automatically or otherwise, the predetermined value based on the vertical beam width of the first array, in one embodiment. The predetermined value specifies a target degree of tilt for modifying the second array, in embodiments.

The predetermined value may be one or more of a plurality of predetermined values that specify a tilt value, a degree of tilt, an angle, a beam boresight position, a 3 dB point, a half power point, and the like, for example, as relative to an axis, such as axis 254 shown in FIGS. 6 and 7, and/or as relative to an aspect of the first array. The predetermined value may be a phase, a phase shift, and/or a factor for applying to a phase and which may be usable to effectuate a timing change for a radiating element. Each of the predetermined values may correspond to a degree of tilt and/or a tilt angle that may be used and/or implemented at an array. The predetermined values may be produced based on predictive signal propagation analysis applied to test antenna arrays, for example. The predetermined values may be produced using empirical data, additionally or alternatively. The predetermined values may be stored in a database on the back-end of a core network, may be stored at a base station, and/or may be stored in memory at a radio tower for access by a controller and/or an actuator, for example.

In some embodiments, the method 300 identifies a site morphology corresponding to the first array and/or the second array. Based on the site morphology, the method 300 may select the predetermined value for the second array based on the site morphology. Site morphology refers to a location classification of the first and second arrays and/or a radio tower associated therewith. Exemplary site morphology classifications include rural, suburban, urban, and dense urban. Site morphology may further account for clutter data (e.g., houses, tree, buildings, and the like which degrade signal). The site morphology may be useful when identifying a predetermined value for the second array because coverage area specifications may differ between the site morphology classifications. Additionally or alternatively, identifying a site morphology corresponding to the first array and/or the second array includes referencing one or more profile patterns that correspond to the site morphology of the first array and/or the second array. For example, a predefined profile pattern for a suburban imbalanced array may be generated from data collected via testing an imbalanced array in a suburban environment and evaluating the data collected using predictive propagation analysis. A predefined profile pattern may be generated for each of many different site morphologies, sub-morphologies, and/or combinations thereof, for example. By referencing a predefined profile pattern for a site morphology that is the same or similar to the site morphology of the first array and/or the second array, a predictive profile pattern of a beam of the first array and/or the second array may be used for the purposes of the method 300, in some embodiments.

In one example, the predetermined value indicates that the second beam of the second array may be modified as n-0.3 degrees for each n degree of tilt of the first beam of the first array, wherein n is a degree of tilt (e.g., a numeric integer, a whole integer, a fraction, a function defining the main beam of the first array, etc.). In another example, the predetermined value indicates that the second beam of the second array may be modified based on the n degrees of tilt of the first beam, the vertical beam width of the first beam, and an urban site morphology of the second array, and that modifying the second array based on the above features may use a phase sift of 0.2 π applied to each radiating element of the second array. It will be understood that the identification of one or more predetermined values may use any array features, combinations of features, site morphologies, technical specifications of an array, and/or physical placement of an array (e.g., height, geography, terrain, climate), as the examples described herein are illustrative only and should not be considered to be limiting.

At block 306, the method 300 communicates an indication of the predetermined value for the second array. In one embodiment, the indication is communicated to one or more electronic actuators and/or one or more phase shifters. In some embodiments, the indication includes instructions for an actuator to shift a phase of one or more of the plurality of radiating elements of the second array, for example, in order to modify the tilt or degree of tilt of the second array. Additionally or alternatively, the instructions communicated may direct an actuator to sequentially and/or incrementally shift a phase of each of the one or more radiating elements of the second array. The instructions may be used by a processor, and/or the electric actuator may use one or more phase shifters to modify the phase and/or the timing of one or more radiating elements of the second array. Modification of the phase of the radiating elements, according to the instructions communicated, may redirect and/or steer the second beam.

The predetermined value may be used to modify the second beam, in embodiments. For example, the predetermined value may modify a degree of tilt of a second beam of the second array by shifting a phase of one or more of the plurality of radiating elements of the second array. The indication of the predetermined value may be communicated to the radio tower 206 from a remote computing device via a core network, such as core network 204, for example. In another example, the indication may be communication sent via controller 210 and/or the base station 208 to the actuator 218 of FIG. 2.

In further embodiments, the method 300 includes adjusting the second beam from a first position to a second position based on the predetermined value. In such an embodiment, adjusting the second beam from the first position to the second position results in directing at least a portion of the vertical beam width of the second beam to be nearer at least a portion of the vertical beam width of the first beam.

In another embodiment, the method 300 includes identifying a first beam width of the first beam and identifying a second beam width of the second beam. In such an embodiment, the first beam width includes a first vertical 3 dB marker and the second beam width includes a second vertical 3 dB marker. The first and second vertical 3 dB markers correspond to half power points of the first and second beams, respectively, in embodiments. For example, in one embodiment, the method 300 implements the predetermined value at the second array to steer the second vertical 3 dB marker of the second beam into alignment with the first vertical 3 dB marker of the first beam.

Figure 9:
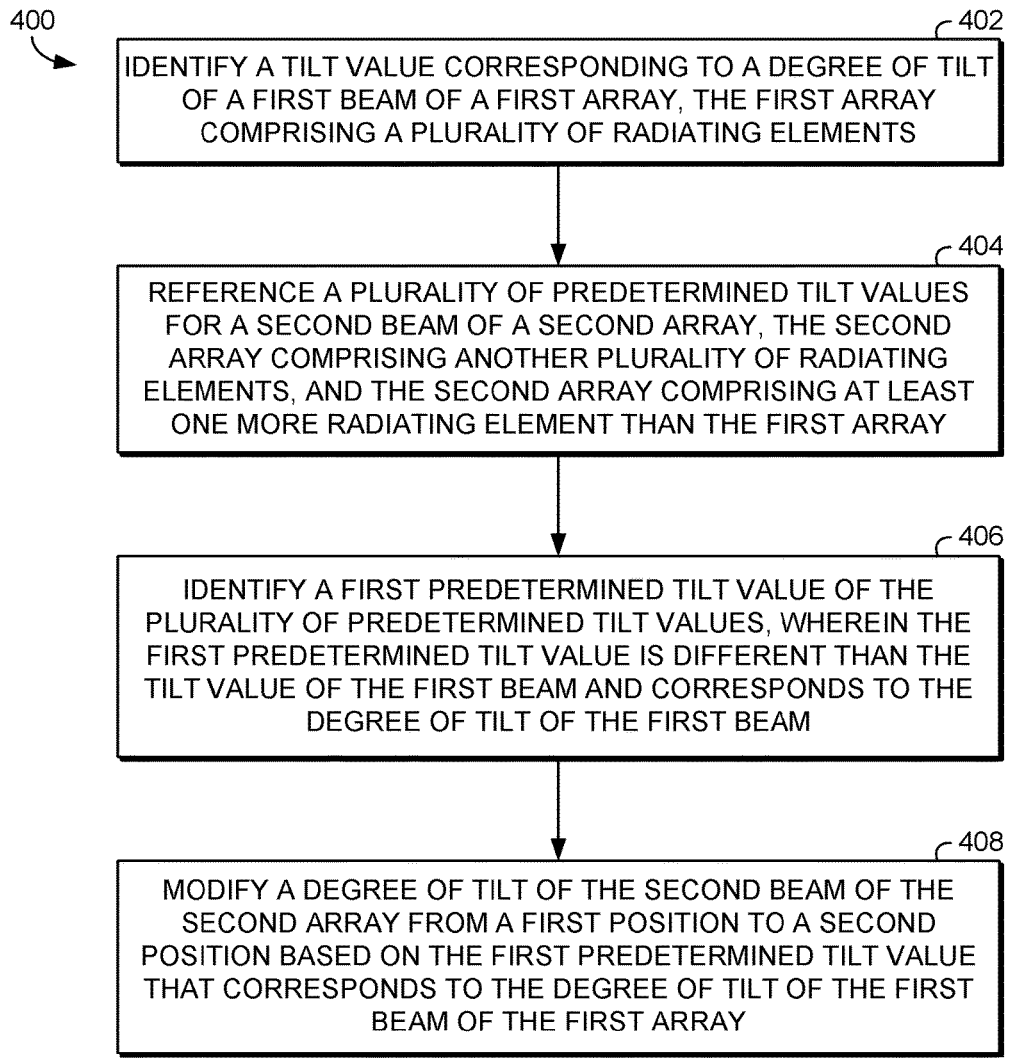
FIG. 9 provides an exemplary method for adjusting beam width in accordance with an embodiment of the present invention.

At FIG. 9, a method 400 for adjusting beam width is provided. The method 400 identifies a tilt value, shown at block 402. In embodiments, the tilt value identified corresponds to a degree of tilt of a first beam of a first array. The first array may include a plurality of radiating elements that produce the first beam, in one embodiment. The method 400 may further include identifying a first vertical 3 dB marker of the first beam of the first array. In one embodiment, the method 400 identifies a second beam of a second array, and further, identifies a second vertical 3 dB marker of the second beam.

Further, in some embodiments, the second array includes another plurality of radiating elements. In a further embodiment, the second array has at least one more radiating element than the first array. The at least one more radiating element of the second array creates an uplink-downlink imbalance for an antenna that comprises the first and second arrays, in one such embodiment. In alternative embodiments, an uplink-downlink imbalance is produced when the first array inactivates one or more radiating elements, such that the first array and the second array may each include the same number of radiating elements. Accordingly, in some embodiments, the method 400 determines an amount of gain of the first array and an amount of gain of the second array. The method 400 may analyze the gain of the first array and the second array in order to identify a difference in gain between the first and second arrays, in one embodiment.

At block 404, the method 400 references a plurality of predetermined tilt values for a second beam of a second array. And at block 406, a first predetermined tilt value of the plurality of predetermined tilt values is identified. In embodiments, the first predetermined tilt value is different than the tilt value of the first beam and corresponds to the degree of tilt of the first beam. For example, the first predetermined value identified might be 4.75 degrees of tilt, wherein the first predetermined value is identified because it corresponds to the 5 degrees of tilt (e.g., a tilt value) of the first beam of the first array. In one embodiment, the first predetermined tilt value is identified because, when implemented at the second array, the first predetermined tilt value may be used to bring a first array beam first vertical marker (e.g., an upper 3 dB point) into alignment, or closer thereto, with a second array beam second vertical marker (e.g., an upper 3 dB point), for example.

In some embodiments, the method 400 references a predicted profile pattern of a site morphology corresponding to the second array and/or the first array. A profile pattern refers to a pattern formed by a powered antenna array, for example, the placement of lobes, nulls, and a main beam. A profile pattern may additionally include information regarding horizontal beam width, vertical beam width, predicted antenna array signal attenuation information, gain, power, predicted interference data, and/or distortion of a lobe and/or beam. A profile pattern may include horizontal cross section information, vertical cross section information, and/or three-dimensional data regarding a beam and/or side lobes, for example.

Additionally or alternatively, the method 400 references a predictive tilt value of another array. Further, a known coverage area of another array may be referenced. A predictive tilt value may be known data regarding an antenna array having the same or similar features as the first array and/or the second array. Exemplary features might include the number of radiating elements, the type of radiating elements, the manufacturer of the radiating elements, the site morphology of the first array and/or the second array, the height of placement of an array, the terrain of the area surrounding an array (e.g., mountainous region, plains, forest), and the like. Known coverage area of another array may include similar information collected regarding a deployed array, wherein the known data of the another array may be used because the another array shares some characteristics with the second array, for example, type, kind, and placement of radiating elements, site morphology, height, and/or climate. These examples are illustrative in nature and further aspects not described herein are considered to be within the scope of the invention and may be used and/or leveraged in the performance of the method 400.

At block 408, the method 400 modifies a degree of tilt of the second beam of the second array. In one embodiment, the second beam is steered and/or directed from a first position to a second position based on the first predetermined tilt value that corresponds to the degree of tilt of the first beam of the first array. For example, the first position may correspond to a position wherein the second array second vertical marker is misaligned with the first array first vertical marker. And, the second position may correspond to a position wherein the second array second vertical marker is closer to being aligned with or is aligned with the first array first vertical marker, for example. In one embodiment, this modification corrects or reduces the negative impact on coverage area caused by a decreased distance of extension of the second beam of the second array, due to a narrower vertical beam width, for example. In some embodiments, modifying the degree of tilt (e.g., by phase shifting one or more of a plurality of radiating elements of the second array) directs the second beam from the first position to a second position, wherein the second position increases the distance of extension of the second beam.

In one embodiment, modifying a tilt value of the second beam of the second array includes implementing, using an electric actuator, the first predetermined tilt value to phase shift one or more of the plurality of radiating elements of the second array. Accordingly, the method may shift a phase of each of the one or more radiating elements of the second array to steer the second beam from the first position to the second position, in one embodiment. In such embodiment, the second position places the second beam closer to the first beam than the first position. Thus, using the method 400, the second vertical 3 dB marker of the second beam may be steered and/or directed into an alignment with the first vertical 3 dB marker of the first beam of the first array, in some embodiments.

The methods 300 and 400 described herein may be performed at any point in time. In one embodiment, the methods 300 and/or 400 are performed at any of the following: when an imbalanced antenna array is deployed at a radio tower; when an imbalanced antenna array is deployed to replace an existing balanced antenna array; when an indication to perform the methods 300 and/or 400 is received from a user (e.g., manually initiated); when an indication to perform the methods 300 and/or 400 is received automatically (e.g., from a core network, controller, and/or base station); in response to an indication that the downlink channel is more powerful that the uplink channel; upon detecting that an uplink channel has greater gain than a downlink channel; and/or based on an indication from a user mobile device (e.g., via a mobile device application used to monitor coverage area and signal aspects). These are merely examples and should not be considered limiting.

Similarly, one or more of the steps of methods 300 and 400 may be initiated and/or performed remotely using a core network, for example. Additionally or alternatively, one or more of the steps may be initiated and/or performed locally at a radio tower, in embodiments. And, the methods 300 and 400 may be preformed automatically in a self optimizing network (SON), for example.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method for aligning beams of imbalanced arrays, the method comprising:
   identifying a degree of tilt and a vertical beam width of a first beam of a first array, the first array comprising a plurality of radiating elements;
   identifying a degree of tilt and a vertical beam width of a second beam of a second array comprising another plurality of radiating elements having at least one more radiating element than the first array, wherein the vertical beam width of the second beam is different than the vertical beam width of the first beam;
   identifying a predetermined value that specifies a target degree of tilt for modifying the second array based on the degree of tilt of the first beam and the vertical beam width of the first beam; and
   communicating an indication of the predetermined value for the second array, wherein the predetermined value modifies the degree of tilt of the second beam of the second array by shifting a phase of one or more of the plurality of radiating elements of the second array, and wherein modifying the degree of tilt of the second beam with the predetermined value balances the second array having the at least one more radiating element than the first array with the first array.

2. The method of claim 1, further comprising:
   adjusting the second beam from a first position to a second position based on the predetermined value, wherein the vertical beam width of the second beam is nearer to the vertical beam width of the first beam at the second position than the first position.

3. The method of claim 1,
   wherein the vertical beam width of the first beam includes a first vertical 3 dB marker, and
   wherein the vertical beam width of the second beam includes a second vertical 3 dB marker.

4. The method of claim 3, further comprising:
   implementing the predetermined value at the second array to steer the second vertical 3 dB marker of the second beam into alignment with the first vertical 3 dB marker of the first beam.

5. The method of claim 1, wherein communicating the indication of the predetermined value for the second array further comprises communicating the indication to an electric actuator, wherein the indication includes instructions for the electric actuator to shift the phase of one or more of the plurality of radiating elements of the second array in order to modify the degree of tilt of the second beam.

6. The method of claim 1, further comprising:
   identifying a site morphology corresponding to the second array; and
   based on the site morphology, selecting the predetermined value for the second array.

7. The method of claim 1, wherein communicating the indication of the predetermined value for the second array further comprises communicating an instruction to sequentially shift the phase of each of the one or more radiating elements of the second array.

8. One or more computer-readable media having computer-executable instructions embodied thereon that, when executed, perform a method for adjusting beam width comprising:
   identifying a tilt value and a vertical beam width of a first beam of a first array, the tilt value corresponding to a degree of tilt of the first beam of the first array, the first array comprising a plurality of radiating elements;
   identifying a tilt value and a vertical beam width of a second beam of a second array, the tilt value corresponding to a degree of tilt of the second beam of the second array, the second array comprising another plurality of radiating elements having at least one more radiating element than the first array, wherein the vertical beam width of the second beam is different than the vertical beam width of the first beam;
   identifying a first predetermined tilt value of a plurality of predetermined tilt values for the second array, wherein the first predetermined tilt value specifies a target tilt value for modifying the second array based on the tilt value of the first beam and the vertical beam width of the first beam; and
   modifying the degree of tilt of the second beam of the second array from a first position to a second position based on the first predetermined tilt value, wherein modifying the degree of tilt of the second beam based on the first predetermined tilt value balances the second array having the at least one more radiating element than the first array with the first array.

9. The media of claim 8, wherein modifying the tilt value of the second beam of the second array from the first position to the second position based on the first predetermined tilt value comprises implementing, using an electric actuator, the first predetermined tilt value to phase shift one or more of the plurality of radiating elements of the second array.

10. The media of claim 8, wherein modifying the tilt value of the second beam of the second array from the first position to the second position based on the first predetermined tilt value comprises shifting a phase of each of the one or more of the plurality of radiating elements of the second array.

11. The media of claim 8, further comprising:
   identifying a first vertical 3 dB marker of the first beam of the first array; and
   identifying a second vertical 3 dB marker of the second beam of the second array.

12. The media of claim 11, wherein modifying the tilt value of the second beam of the second array from the first position to the second position based on the first predetermined tilt value comprises steering the second vertical 3 dB marker of the second beam to align with the first vertical 3 dB marker of the first beam of the first array.

13. The media of claim 8, wherein identifying the first predetermined tilt value of the plurality of predetermined tilt values further comprises referencing a profile pattern of a site morphology corresponding to the second array.

14. The media of claim 8, further comprising determining an amount of gain of the first array and an amount of gain of the second array.

15. The media of claim 8, wherein modifying the tilt value of the second beam of the second array from the first position to the second position based on the first predetermined tilt value comprises shifting a phase of each of the one or more radiating elements of the second array to steer the second beam from the first position to the second position, wherein the second position places the second beam closer to the first beam than the first position.

16. The media of claim 8, wherein identifying the first predetermined tilt value of the plurality of predetermined tilt values further comprises referencing a predictive tilt value and a coverage area of another array.

17. The media of claim 8, further comprising modifying the degree of tilt of the second beam of the second array from the second position to a third position.

18. A system for adjusting beam width, the system comprising:
- an actuator configured to drive electric tilt of a plurality of radiating elements;
- an antenna having a first array and a second array, each of the first and second arrays including one or more radiating elements, wherein the second array has at least one more radiating element than the first array, and wherein the second array is a receiver-only array; and
- a controller configured to:
  - identify a degree of tilt and a vertical beam width of a first beam of a first array;
  - identify a degree of tilt and a vertical beam width of a second beam of a second array, wherein the vertical beam width of the second beam is different than the vertical beam width of the first beam;
  - identify a predetermined tilt value that specifies a target tilt value for modifying the second array based on the degree of tilt of the first beam and the vertical beam width of the first beam; and
  - communicate instructions to the actuator to drive the electric tilt of the one or more radiating elements of the second array based on the predetermined tilt value that specifies the target degree of tilt for modifying the second array, wherein driving the electric tilt of the one or more radiating elements of the second array based on the identified predetermined tilt value balances the second array having the at least one more radiating element than the first array with the first array.

* * * * *